Feb. 17, 1931.  A. OLSON  1,792,922
DUSTPROOF OIL BEARING
Filed July 3, 1929
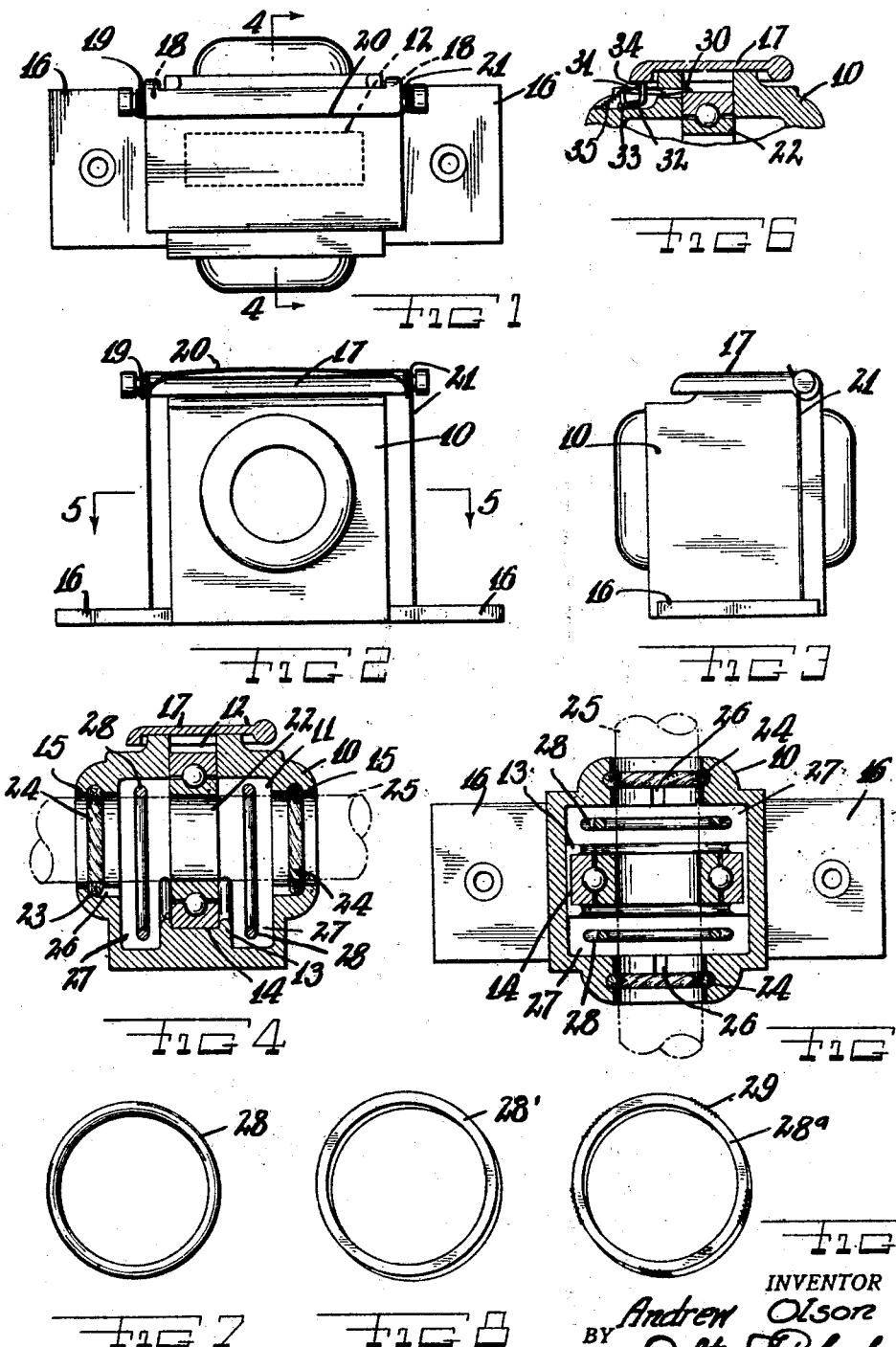
INVENTOR
Andrew Olson
BY
ATTORNEY Patented Feb. 17, 1931

1,792,922

UNITED STATES PATENT OFFICE

ANDREW OLSON, OF NEW YORK, N. Y.

DUSTPROOF OIL BEARING

Application filed July 3, 1929. Serial No. 375,664.

This invention relates to new and useful improvements in ball bearing pillow blocks.

The invention has for an object the provision of a device of the class mentioned which is of simple durable construction, dependable in use and efficient in action and which may be manufactured and sold at a reasonable cost.

The invention proposes a hollow body with a transverse top vertical slot of a width of a specific ball bearing race and in line with a portion of a circular groove for receiving the outer ball race of said bearing and located within the hollow, and having its center of curvature coinciding with shaft passage apertures aligned and in opposite walls of the body so that a ball bearing may be dropped into the body thru the top slot, and a shaft forced thru the body apertures and the inner race of the ball bearing.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a plan view of a device constructed according to this invention.

Fig. 2 is a front elevational view of Fig. 1.

Fig. 3 is an end elevational view of Fig. 2.

Fig. 4 is a vertical sectional view taken on the line 4—4 of Fig. 1.

Fig. 5 is a horizontal sectional view taken on the line 5—5 of Fig. 2.

Fig. 6 is a fragmentary view similar to Fig. 4 but illustrating a modification.

Figs. 7, 8 and 9 are perspective views of various oil rings for use in the device.

The reference numeral 10 indicates generally a body formed of one integral piece of metal material and hollow indicated by numeral 11, and provided with a top transverse slot 12 communicating with the hollow 11. The width of the slot 12 is slightly larger than the width of a ball bearing race and the length is slightly larger than the diameter of the race so that this particular ball bearing may be inserted thru the slot within the hollow.

The body 10 is formed with an internal ridge 13 located directly beneath the slot 12 and formed with a circular groove portion 14 for receiving a ball bearing race inserted thru the slot. The width of the groove is such as to tightly receive the ball race. The ends of the body 10 are formed with shaft passage apertures 15 aligned with each other and in line with the central opening of a ball bearing race inserted within the body. These shaft passage apertures communicate with the exterior and with the hollow interior 11. Lugs 16 project from the body 10 and constitute feet for supporting the same.

A cover 17 is hingedly mounted upon the top of the body 10 as at 18 and is normally urged into a closed position by a spring 19. This spring has a central portion 20 extending across the cover and end portions 21 engage around the hinge pins of the cover. A ball bearing 22 is illustrated positioned within the body. The outer ball race is shown engaged in the groove 14 and in the slot 12. This ball race was inserted thru the slot 12.

The body 10 is also formed with circular grooves 23 within the shaft passage apertures 15. Oil packing strips 24 engage in these grooves and are adapted to snugly engage about a shaft as illustrated by dot and dash lines 25. A return passage 26 connects the grooves 23 with the interior 11. The lower portion of the hollow interior 11 of the body constitutes oil chambers and is indicated by reference numeral 27. Oil should be engaged in these portions and rings such as 28 should be loosely engaged upon the shaft 25 and extend into the oil chambers 27.

During rotation of the shaft, these rings are depended upon to carry the oil upwards for splashing the oil and causing the oil to enter between the ball races of the ball bearing. The packing strips 24 prevent the trailing of oil along the shaft to the exterior of the pillow block. The rings 28 are illustrated circular in transverse cross section. Figs. 8 and 9 illustrate modified forms of rings. In Fig. 8 a flat ring 28' has been illustrated, In Fig. 9 a flat ring 28ᵃ has been shown formed with roughened outer portions 29.

In the modified form of the device illustrated in Fig. 6, a latch 30 has been shown slidably mounted for holding the ball bearing down within the pillow block when the latch is in its extended position. This latch connects with a link 31 connected with one arm of a bell crank 32 pivoted as at 33. The other end of the bell crank is rigidly attached with an arm 34 having its end abutting against the bottom side of the cover 17. A spring 35 acts between the body 10 and the bell crank for normally urging the latch 30 into its retracted position. When the cover 17 is in its closed position, it holds the arm 34 down so that the bell crank 32 is in a pivoted position for holding the latch 30 in its extended position. The cover 17 may be manually opened and then automatically, spring 35 pivots the bell crank for retracting the latch 30 so that the ball bearing may be slipped upwards thru the slot 12.

In operation of the device the ball bearing may be inserted within the pillow bar or removed from the bar thru the passage 12. The cover 17 is depended upon to prevent dust and dirt from entering within the block. The shaft 25 must be forced thru the inner ball race and in this condition, the pillow block is ready for use. Before the ball bearing may be removed it is necessary to first remove the shaft.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a ball bearing pillow block, a body with an internal circular groove and with a top slot communicating with said groove for the insertion of a ball bearing into said groove and with side openings for the passage of a shaft thru the inner race of an inserted bearing, and a ball bearing inserted thru said slot into said groove so as to be held against lateral movements.

2. In a ball bearing pillow block, a hollow body with a top slot communicating with the interior for the insertion of a ball bearing and with side openings for the passage of a shaft thru the inner race of an inserted bearing, and said body being formed with a grooved ridge in line with said top slot for laterally holding an inserted ball bearing, and a ball bearing of a size to rest in the groove of said ridge and also extended partially into said slot so as to be held against lateral movement.

3. In a ball bearing pillow block, a body with a top slot for the insertion of a ball bearing and with side openings for the passage of a shaft thru the inner race of the bearing, a spring operated cover for normally closing the slot, and a means for holding a ball bearing within the slot when said cover is closed and automatically releasing the ball bearing upon the opening of the cover.

In testimony whereof I have affixed my signature.

ANDREW OLSON.